April 19, 1949.   L. BATCHELDER   2,467,368
SUBMARINE SOUND DIRECTION DETERMINING SYSTEM
Filed Sept. 23, 1943   4 Sheets-Sheet 1
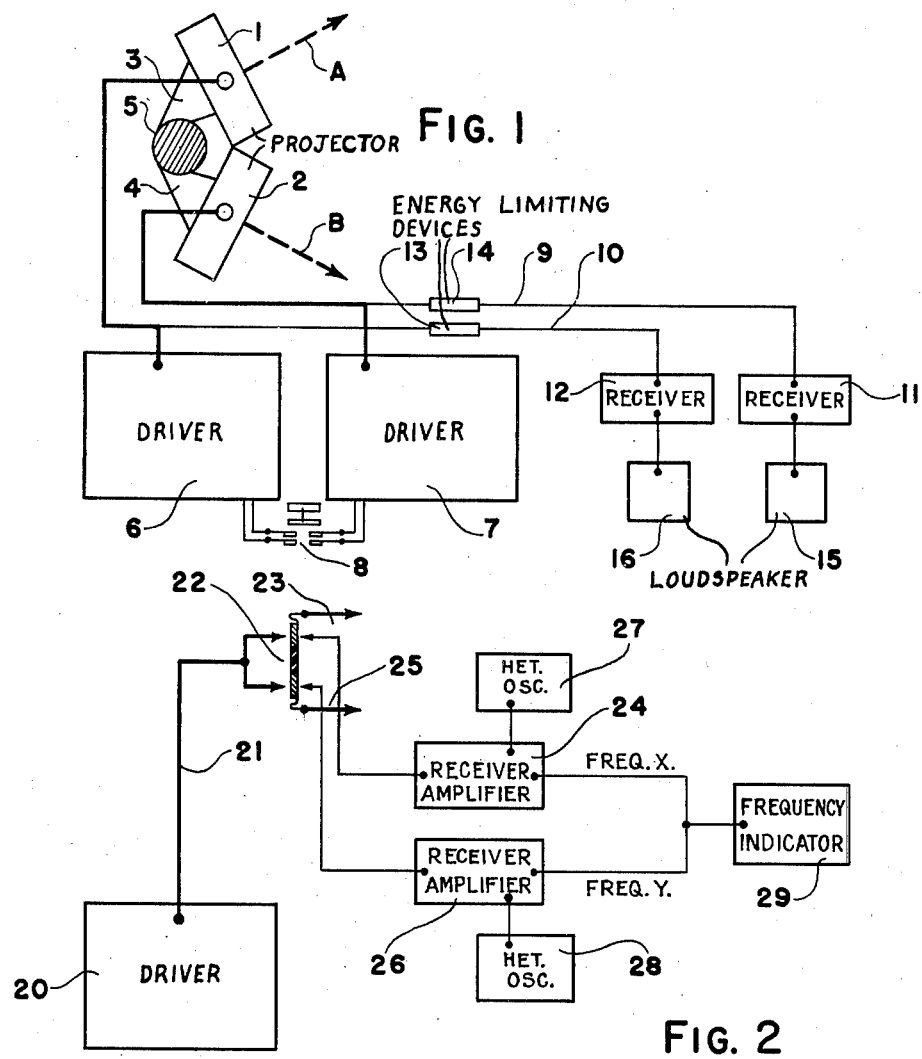
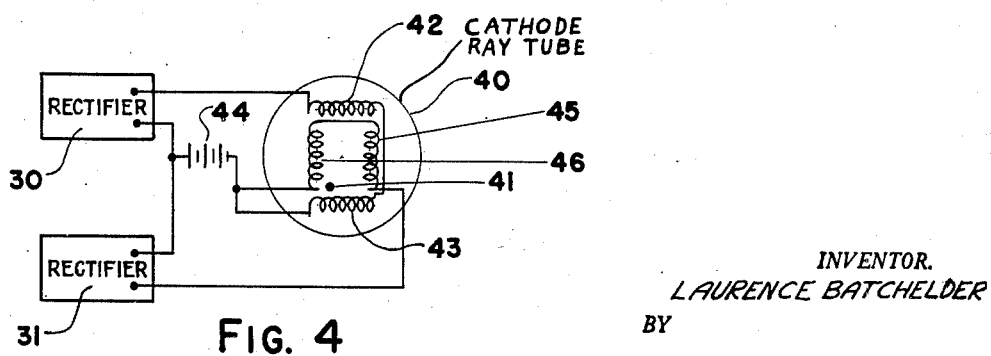
INVENTOR.
*LAURENCE BATCHELDER*
BY April 19, 1949.  L. BATCHELDER  2,467,368
SUBMARINE SOUND DIRECTION DETERMINING SYSTEM
Filed Sept. 23, 1943  4 Sheets-Sheet 2

INVENTOR.
LAURENCE BATCHELDER
BY
Ezekiel Wolf

Patented Apr. 19, 1949

2,467,368

UNITED STATES PATENT OFFICE 2,467,368

SUBMARINE SOUND DIRECTION
DETERMINING SYSTEM

Laurence Batchelder, Cambridge, Mass., assignor, by mesne assignments, to Submarine Signal Company, Boston, Mass., a corporation of Delaware Application September 23, 1943, Serial No. 503,580

20 Claims. (Cl. 177—386)

The present invention relates to a method and means for determining the direction of an object capable of reflecting wave energy impinging upon it or emitting wave energy. More particularly the present invention is applicable to the art of submarine signaling for direction determination of an unknown object capable of reflecting compressional wave energy or emitting compressional wave energy either positively, by the operation of the object, as, for instance, a vessel or by its motion or by some other means.

The present invention may be used in systems for general listening and in systems in which the listening devices themselves act as a transmitter of a beam of compressional waves or in which separate means having characteristic beam patterns are used for producing and for receiving compressional wave energy. In this respect the invention may be applied to means using supersonic compressional wave projectors which may act as transducers, that is, serve both for sending and receiving, or separate sending and receiving units may be employed.

In accordance with the general system as outlined above two individual transducers or receivers may be employed, each having a characteristic beam pattern with the axis of the beam of each directed in different directions with a small angle between the two axes.

The system for echo ranging described in brief above may be called a split beam system or a double beam or twin beam system. The split or double beam may be obtained by means of two projectors or transducers or by a single projector or transducer capable of producing two main component beams and of being directive to reception in the directions of the main beam components.

Various methods of indicating whether the object being detected is between the axes of the two beams or to one side or the other of the beam may be employed with varying advantages, depending to some extent upon the application and use for the specific embodiment of the invention.

Figure 3:
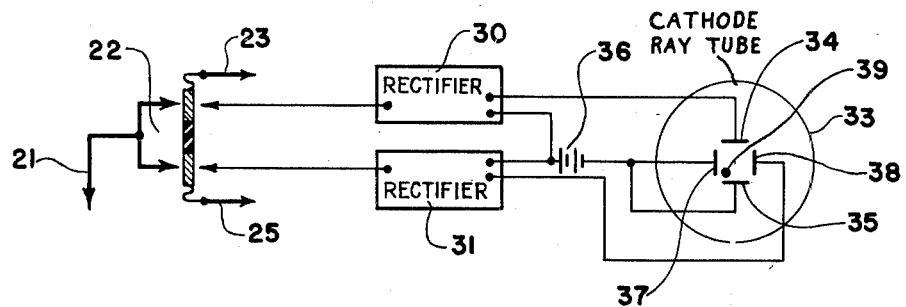
Figure 5:
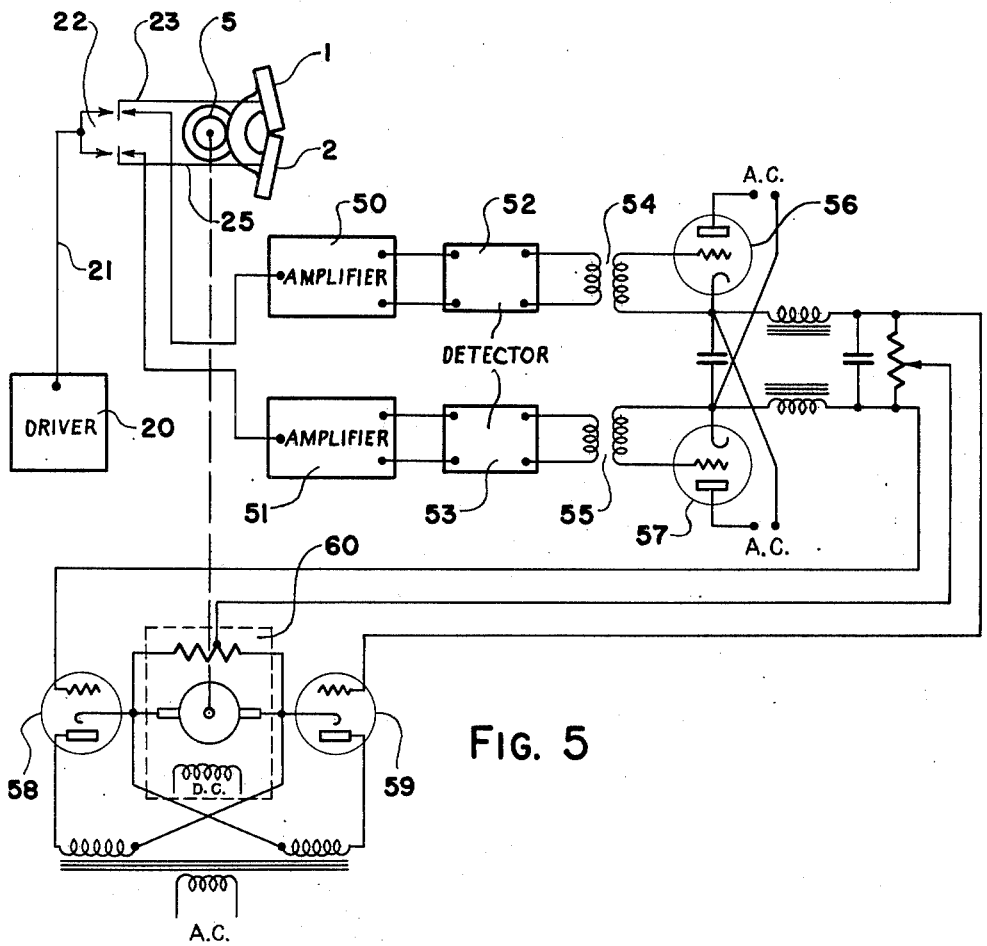
Figure 6:
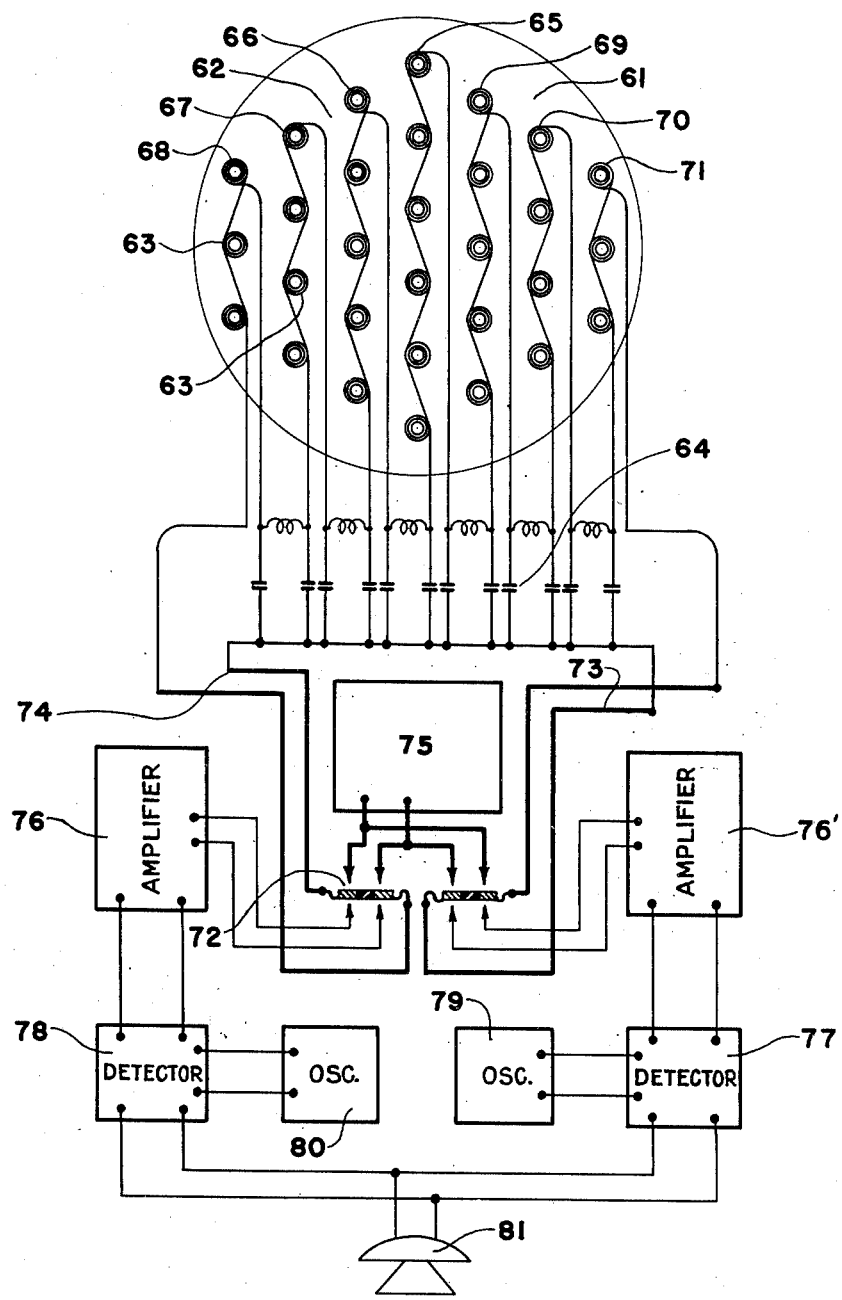
Figure 7:
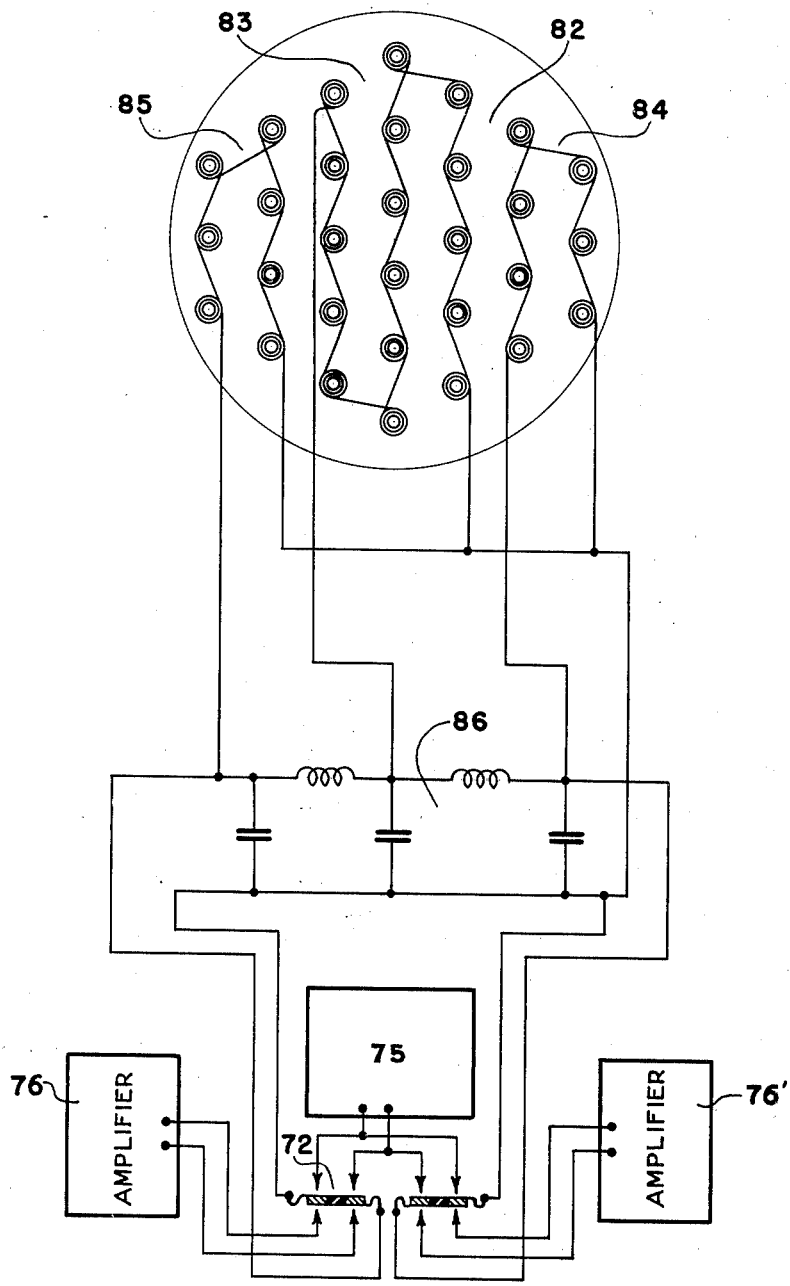

This will be more clearly and fully described in the specification which follows in connection with the drawings illustrating the same in which Fig. 1 shows the general system employing separate power supplies for each projector; Fig. 2 shows schematically a second system employing a single source of power; Fig. 3 shows schematically a portion of system using a cathode ray tube as an indicator; Fig. 4 shows a further modification of a portion of the diagram of Fig. 3 illustrating a further method of utilizing a cathode ray beam as an indicator; Fig. 5 shows a system in combination with a follow-up mechanism for maintaining the projector assembly directed against the object being searched; Fig. 6 shows another form of the invention employing a single projector and a single driver, the projector producing a double beam; and Fig. 7 is a modification of the arrangement illustrated in Fig. 6.

In the arrangement indicated in Fig. 1 two projectors 1 and 2 may be provided mounted on supporting arms or brackets 3 and 4, respectively, which extend from the shaft 5 which may be rotated in any known manner by power or manually if desired. These projectors 1 and 2 may be of a usual type used in submarine signaling, such, for instance, as disclosed in the application of Edwin E. Turner, Jr., Serial No. 677,179, filed June 23, 1933, which matured into Patent No. 2,407,328, the application of Beverly R. Hubbard, Serial No. 669,477, filed May 5, 1933, which matured into Patent No. 2,452,570, or as disclosed in my prior application Serial No. 663,963, filed April 1, 1933, which matured into Patent No. 2,407,242. For this purpose the projectors 1 and 2 may be of a magnetostrictive, piezoelectric, magnetic or dynamic type, and they may be provided with large radiating surfaces as compared to the wave length of the compressional wave in the propagating medium in order to produce a directive beam of compressional waves. If desired, the radiating surfaces of the projectors 1 and 2 may have a chosen or selected radiation distribution in order to concentrate a greater amount of compressional wave energy in the main maximum and decrease the energy in the auxiliary maxima. This may be accomplished by use of the principles disclosed in the applications of Harold M. Hart, Serial No. 285,902, filed July 22, 1939, which matured into Patent No. 2,407,271, the application of Edwin E. Turner, Jr., Serial No. 285,910, filed July 22, 1939, which matured into Patent No. 2,407,329, or my prior application Serial No. 287,974, filed August 2, 1939, which matured into Patent No. 2,407,244.

The projectors 1 and 2 are in close acoustic contact with the propagating medium, as, for instance, the sea water in which they may be immersed with the radiating surface of each projector in contact with the medium. If the device is to be used on a moving vessel, it may be projected through the vessel in the usual manner, and be rotated in a chamber which provides the acoustic coupling means with the outer propagating medium in manners which are commonly used in submarine acoustics, for instance, as described in the application of Robert L. Williams, Serial No. 40,587, filed September 14, 1935, which matured into Patent No. 2,407,697, or the application of Ralph E. Bates, Serial No. 468,302, filed December 7, 1942, which matured into Patent No. 2,400,870. The dotted arrows A and B indicate the direction of the main maximum, and this angle between the arrows A and B, which is shown somewhat exaggerated in Fig. 1 may be a few degrees or less. As indicated in Fig. 1, projectors 1 and 2 are energized respectively by the drivers 6 and 7 which may under ordinary conditions be high frequency oscillators, capable of producing frequencies of the order of 10 to 20 kilocycles to which the projectors 1 and 2 may be tuned. The frequencies emitted by the oscillators 1 and 2 may be the same or different frequencies.

If the system in Fig. 1 is used for sound ranging, that is in which a sound impulse is transmitted and the echo from the reflecting object received on the projectors 1 and 2, then it is necessary to key the drivers 6 and 7 by means of the key 8 in order to transmit into the propagating medium, a compressional wave impulse. An apparatus capable of both transmitting and receiving is commonly called a transducer and this may be applied to the elements 1 and 2 of Fig. 1.

When the echo or sound reflection is received on the projectors now acting as receivers, this received energy is transmitted over the lines 9 and 10 to the individual receivers 11 and 12, respectively. Energy-limiting devices 13 and 14 may be installed in the lines 9 and 10 to prevent excessive direct excitation of the receiver from the drivers when they are transmitting. The receivers 11 and 12 may operate loud speakers 15 and 16, respectively, or any other type of indicating mechanism.

In the operation of the system of Fig. 1, if the loud speaker or indicator 16 gives a more intense signal than the indicator 15, then it will be known that the greater part of the received energy is received on the projector 1 now acting as the receiver. Since a greater part of the energy is received on the projector 1, it being assumed that both receivers 11 and 12 are substantially equally balanced, and therefore, amplify equally, it follows that the target or object being detected and observed is more directly in line with the arrow A than with the arrow B, so that the assembly of the transducer units must be turned slightly counterclockwise as viewed in Fig. 1 in order to balance the intensity of the indication on the indicators 15 and 16. If the energy on the indicator 15 were louder than that on the indicator 16, then the projector assembly would have to be rotated in a clockwise direction in order to equalize the sound balance.

The arrangement indicated in Fig. 1 illustrates the use of two oscillators or drivers 6 and 7 and is the most general system. The system may, however, be run with only one driver or oscillator, the two projectors here necessarily operating to send the same frequency. Such an arrangement is indicated in Fig. 2 where the driver 20 supplies the projectors over the power lines 21 through the sending receiving switch 22 which transfers from sending to receiving after the wave impulse has been emitted by the projectors. When the switch 22 is in the receiving position, the projector line 23 is connected to the receiver amplifier 24, while the projector line 25 is connected to the receiver amplifier 26. In this case each receiver amplifier is used in combination with a heterodyne oscillator 27 and 28, respectively, thereby producing distinctive beat frequencies, as, for instance, frequency X from the receiver amplifier 24 and frequency Y from the receiver amplifier 26. Both of these frequencies may be impressed upon a frequency indicator 29 which may indicate the comparative frequency intensities of the two signals. If both frequencies are equally received, as, for instance, on a reed frequency meter, then it will be evident that the object is lying between the two beams A and B. However, if one frequency predominates in intensity over the other frequency, then the object will be lying more nearly in the direction corresponding to the predominating frequency.

In each case, that of Fig. 1 or 2, it is to be understood that the sharpest and most intense signal is received when the object is lying in the axis of main maximum beam, and that sounds received from directions other than from this axis are received at reduced intensities.

In the arrangement indicated in Figs. 3 and 4 a similar driver and sending-receiving switch may be used as in Fig. 2 and it has therefore been labelled with the same numbers. The same remarks also apply to the projector and projector lines. In this case, however, when the transfer switch 22 is shifted to receiving, each projector is connected to a separate rectifier 30 and 31 which rectifies the high frequency signals received on each projector. The output of the rectifiers may be impressed upon the static plates of a cathode ray oscilloscope tube 33, the rectifier 30 being connected across the pair of plates 34 and 35 through a common battery 36 while the rectifier 31 is connected across the static plates 37 and 38 through the same battery 36. The battery 36 is common in the line with the plates 35 and 37. If the cathode ray tube is provided with a cathode beam 39 indicated by the dot within the tube, then the initial bias produced by the battery 36 will attract the beam to the lower-left corner towards the intersection of the projection of the plates 35 and 37. From this position the beam will be moved depending upon the relative intensities of the plates 34 and 38 with respect to the plates 35 and 37.

If the greater amount of received energy should be transmitted to the rectifier 30, then the beam would be attracted towards the plate 34, and therefore move in a vertical direction as viewed in Fig. 3. If, on the other hand, the rectified signal from the rectifier 31 is more intense than that of the rectifier 30, then the plate 38 will exert a relatively greater attraction on the beam 39 and the beam will be drawn to the right. The angle of indication, therefore, for the variation between the two directions of the beam is approximately an angle of 90 degrees in the indicator 33, whereas the actual deviation between the two beams may be only a few degrees or less. The median position, that is when both rectifiers are equally affected by the signal, is a direction at 45 degrees between the adjacent plates which would indicate a normal mid-position of the object or target.

In the arrangement indicated in Fig. 4 the rectifiers 30 and 31 are connected to a cathode ray oscilloscope tube 40 in which the beam 41 is deflected by means of the magnetic fields produced by coils 42 and 43 connected in series with each other, and with the battery 44 to the rectifier 30. Similarly the coils 45 and 46 are connected in series with each other and with the battery 44 across the terminals of the rectifier 31. The action of the beam indicated by the dot 41 in the tube 40 will be the same as that of the beam 39 in the tube 33 of Fig. 3. For a median position of the target or object being observed, the angle of the beam with respect to the direction of the coils will be the bi-sector of the angle between the axis of the coils, and in event that the coils are positioned at right angles to one another, the median position of the target or object being searched, will be that of the 45 degree bi-sector.

In the arrangement indicated in Fig. 5, means is shown for keeping the transducer system directed toward the observed target. In this case the driver and projector and change-over switch from sending and receiving may be the same as employed in Fig. 2. In the receiving position the projectors are connected to receive on amplifiers 50 and 51, the outputs of which are fed into detectors 52 and 53, respectively. The outputs of these detectors are impressed upon transformers 54 and 55 whose secondaries control the grids of a pair of high vacuum rectifier tubes 56 and 57 which may be identified in the circuit of Satterlee's Patent No. 2,131,759, issued October 4, 1938, as tubes 19 and 18, respectively. The rest of the circuit indicated in Fig. 5 is similar to the rest of the circuit shown in Fig. 1 of the said Satterlee patent. The tubes 56 and 57 control the operation of the thyratron tubes 58 and 59 which, in turn, control the direction of the current flowing through the motor 60 corresponding to the motor 1 of Fig. 1 in the Satterlee patent referred to. The motor 60 and the shaft 5 are coupled together so that the motor may drive the shaft 5. The arrangement of the follow-up system is such that when the signal is more intensely received on one projector than on the other, the motor 60 rotates the shaft 5 in such a direction as to weaken the signal that is more intensely received until a neutral balance is obtained by equal excitation of the grids of the tubes 56 and 57. Accordingly the direction of rotation of the motor 60 will reverse itself to provide a balance in which the beams of the projectors 1 and 2 produce equal reflections from the object or target being searched.

In the arrangement indicated in Fig. 6 a projector 61 is schematically shown in which each half of the projector produces a beam with a small angular opening between the two axes of the beam. This may be accomplished as indicated in Fig. 6 by the use of a radiating surface or diaphragm 62 which carries on one side of it a great number of magnetostrictive compressional wave generating tubes 63 etc., similarly as disclosed in the patent of Edwin E. Turner, Jr., No. 2,407,328, mentioned previously. Arrangement of Fig. 6, however, distinguishes from the Turner application set forth above in that the magnetostrictive tubes 63 are excited in groups with impressed phase differences by means of a retardation transmission line 64 such as to produce a so-called split beam. This may be accomplished by successively retarding by greater amounts the rows of tubes nearer the midsection of the diaphragm or radiating member; for instance, the rows 68, 67, 66 and 65 being each more retarded than the one before it by connecting each row to a section further along the retardation line 64 so that in effect the phase of the row 65 will lag behind that of 66.

If each section has an equal time lag, then the phase angle between the successive rows 68, 67, 66 and 65 will be equal. In the same manner the phase angle between the rows 65, 69, 70 and 71 will also be equal. A greater number of tubes may be used towards the center of the radiating surface than towards the edges so that the main maxima of the split beams will be accentuated over the auxiliary maxima. In this manner a split beam may be produced with maximum intensities at a few degrees from one another in a direction at right angles to the surface of the projector, or as a matter of fact in a direction at any other angle to the surface of the projector by so apportioning the phase displacement between successive rows of driving elements.

In place of using compressional wave generating elements of the magnetostriction type individual units may be used as disclosed in my Patent No. 2,407,242 previously mentioned and if desired, other material means may be used such as piezoelectric means, electromagnetic means or electrodynamic means.

According to the circuit of Fig. 6, power is impressed upon the radiating member 61 when the switch 72 is thrown to transmission from both ends of the transmission line 64 over the conductors 73 and 74. A driver 75 may be provided for this purpose and there will be transmitted by the projector a composite characteristic pattern made up of two lobes with axes directed a few degrees from one another. This means that the lobes overlap in the section between the axes. When the switch 72 is thrown for reception, the driver 75 is disconnected from the retardation line, and the retardation line is connected through the cable 73 at one end to the amplifier 76' and at the other end by the cable 74 to the amplifier 76.

The receiving circuit may otherwise be as indicated in Fig. 2, or substantially similar thereto, comprising detectors 77 and 78 which are operated in connection with heterodyne oscillators 79 and 80, respectively, producing as a result two beat notes, one of which may be 1200 cycles from the detector 78, if a 20 kilocycle signal is mixed with a signal having a value of 18.8 kilocycles, and the other a 500 cycle note where the 20 kilocycle signal is mixed with a local signal of 19.5 kilocycles. Any type of indicator may be used as, for instance, a loud speaker 81 or a frequency meter or two tuned units, and heterodyning frequencies of various combinations may be used to operate them. If both signals are heard with equal intensity, then it will be evident that the projector is directed on the target.

It will be noted that in the arrangement of Fig. 6, the directive effect for reception is substantially similar to that for transmission and the center row of units has its signal delayed the maximum in being impressed upon the amplifier and detector circuits. The line 64 may be properly designed to prevent reflections in accordance with the principles disclosed in the design of retardation lines commonly used with electric compensators.

In the arrangement indicated in Fig. 7 a somewhat simplified diagram of the operation of the radiating element 82 is shown. Here the units may be individually driven or mounted on a radiating surface. The center group of units 83 may be connected in shunt across the retardation line 86 at its center point, and the end groups 84 and 85 may be connected in shunt across the end sections of the transmission line. In this case, therefore, the line would only have in effect two sections, but will, however, produce a split beam with two main lobes whose axes are separated by a few degrees. The arrangement in Fig. 7 for driving and for reception may otherwise be the same as in Fig. 6 with the same driver 75 and the same change-over switch 72. The arrangement in Figs. 6 and 7 may be used with the receiving means indicated in Fig. 2 but may also be operated by the means shown in Figs. 3, 4 or 5, in which case the heterodyne units may be omitted and the detectors may be made to operate cathode ray tubes as indicated in Figs. 3 and 4 or the training control indicated in Fig. 5.

Having now described my invention, I claim:

1. A method of echo ranging which comprises directing a double beam of compressional wave energy at the object or target being searched, said beam having a small angle between the maximum axes of the main components of the double beam, receiving the reflections therefrom and determining by a balance between the intensity components of the reflections received the direction of the target or object being searched.

2. A method of echo ranging which comprises directing a double beam of compressional wave energy at the object or target being searched, said beam having a small angle between the maximum axes of the main components of the double beam, receiving the reflections therefrom on independent receiving means, each having a directional characteristic corresponding to a main beam component, establishing a distinctive characteristic for each receiving means and determining by simultaneous comparison thereof the direction of the target or object being searched.

3. A method of echo ranging which comprises directing a double beam of compressional wave energy at the object or target being searched, said beam having a small angle between the maximum axes of the main components of the double beam, receiving the reflections therefrom, heterodyning to different frequencies each of the received main beam components and determining by simultaneous comparison of the signals of different frequencies produced the bearing of the target or object being searched.

4. A direction finding system for determining the direction of an object or a target comprising means for producing a double beam of sound waves, said beam having two axes of substantially equal maximum intensity directed at slightly different angles, means for receiving said beam after reflection from the object or target being observed on separate receiving elements both having similar directional characteristics directed at slightly different angles, and means providing a simultaneous comparison of intensity of the reflections received by each of said receiving means.

5. A direction finding system for determining the direction of an object or a target comprising means for producing a double beam of sound waves, means for receiving said beam after reflection from the object or target being observed on separate receiving elements, separate means for rectifying the energy received on each receiving element, cathode ray tube means providing a cathode ray beam having deflecting elements adaptable when energized with a potential to produce a controllable deflection thereof, and means connecting said rectifying means to said cathode ray tube means for producing a comparison of intensity of reflections received on each receiving means.

6. A direction finding system for determining the direction of an object or a target comprising means for producing a double beam of sound waves, means for receiving said beam after reflection from the object or target being observed on separate receiving elements, separate means for rectifying the energy received on each receiving element, cathode ray tube means providing a cathode ray beam having deflecting plates adaptable when energized with a potential to produce a controllable deflection thereof, and means connecting said rectifying means to said cathode ray tube means for producing a comparison of intensity of reflections received on each receiving means.

7. A direction finding system for determining the direction of an object or a target comprising means for producing a double beam of sound waves, means for receiving said beam after reflection from the object or target being observed on separate receiving elements, separate means for rectifying the energy received on each receiving element, cathode ray tube means providing a cathode ray beam having deflecting coils adaptable when energized with a potential to produce a controllable deflection thereof, and means connecting said rectifying means to said cathode ray tube means for producing a comparison of intensity of reflections received on each receiving means.

8. A direction finding system for determining the direction of an object or target comprising means providing a radiating surface, means for energizing the radiating surface in sections to produce a double beam of energy having two main lobes with an intermediate section of weak intensities, means including in part said last-named means for receiving the reflections from the object or target being observed, and means independently indicating the intensities of the energies received on each section of said radiating surface.

9. In a direction finding system for determining the direction of an object or target, a single radiating surface, means for energizing the radiating surface in sections to produce a double beam of energy having two main lobes with an intermediate section of weak intensity, comprising a plurality of individual driving members distributed over the radiating surface in driving connection therewith, and means for energizing said driving members with phase displacements to produce a double beam.

10. In a direction finding system for determining the direction of an object or target, a single radiating surface, means for energizing the radiating surface in sections to produce a double beam of energy having two main lobes with an intermediate section of weak intensity, comprising a plurality of individual driving members distributed over the radiating surface in driving connection therewith, and means for energizing said driving members with phase displacements to produce a double beam, said last-named means including a retardation line having sections between various groups of driving members in accordance with the geometrical arrangement and spacing of said members.

11. A direction finding system for determining the direction of an object or target comprising means providing a radiating surface, means for energizing the radiating surface and for receiving energy impinging on the radiating surface to produce an energy characteristic pattern having two main lobes with a small angular separation between them, and means for producing independent indications of the intensities corresponding to the received energies in the direction of the main lobes.

12. A direction finding system for determining the direction of an object or target comprising means providing a radiating surface, means for energizing the radiating surface and for receiving energy impinging on the radiating surface to produce an energy characteristic pattern having two main lobes with a small angular separation between them including a retardation line for retarding the energy delivered or received to or from the radiating surface, and means for producing independent indications of the intensities corresponding to the received energies in the direction of the main lobes.

13. A system of echo ranging including means for directing a beam of wave energy at an object or target being searched, means for receiving wave energy reflected therefrom including effectively independent receiving means having similar directional characteristics whose main directional axes are separated by a small angle, and means for determining by simultaneous comparison of the relative intensities of the outputs of said receiving means the relative direction of the target with respect to the medial line of said angle between said directional axes.

14. Apparatus for determining the direction of a source of wave energy comprising a multisection transducer having a direction sensitive lobe pattern the axis of which is normally perpendicular to the active face of said transducer, phase shifting means connected in circuit with each transducer section, means for combining a phase shifted output from one transducer section with an unshifted output from other transducer sections thereby corresponding to a shift in the axis of said pattern to one side of said perpendicular to produce a first output quantity, and means for similarly and simultaneously producing a second output quantity but with a shift in the axis of said pattern to the other side of said perpendicular, said shifted patterns being overlapped.

15. The combination in the preceding claim and further including means for comparing and indicating the relative amplitudes of said first and second outputs.

16. Means to receive and indicate the direction of the source of an underwater sound including, a plurality of members constituting an array capable of translating received acoustic energy into electrical energy, connections between said members to form a plurality of channels, each deriving its signal from more than one member, said connections including phase shifting means such that each channel represents a different directivity of the array, means to amplify the output of each channel, and means to utilize simultaneously selected outputs of the several channels by comparison to indicate the direction of the sound source.

17. Apparatus for determining the direction of a source of wave energy comprising a pair of transducers disposed closely adjacent each other and having their active faces coplanar, an output circuit for each transducer, phase shifting means connected in each output circuit, means combining a phase shifted output in each of said output circuits with an unshifted output from each of the other of said output circuits to produce two resultant outputs, means to modulate each resultant output at a different frequency, means combining said resultant outputs into a common channel, and means for comparing the amplitudes of said resultant outputs.

18. Apparatus for determining the direction of a source of wave energy comprising a pair of transducers disposed closely adjacent each other and having their active faces coplanar, an output circuit for each transducer, phase shifting means connected in each output circuit, means combining a phase shifted output in each of said output circuits with an unshifted output from each of the other of said output circuits to produce two resultant outputs, means combining said resultant outputs into a common channel, and means for comparing the amplitudes of said resultant outputs.

19. A system for determining the direction of a source of wave energy comprising a receiving device having right and left lobe characteristics providing two different signals having varying time retardation between themselves depending upon the orientation of said receiving device, phase shifting means connected across said receiving device for combining a phase shifted portion of each signal with an unshifted portion of the other signal, whereby a difference in phase is converted to a difference in intensity, means for converting the signals so changed into characteristic signals having different frequencies corresponding to the original signals, and indicating means operatively connected thereto for producing indication of the directive sense of said signals.

20. A system for determining the direction of a source of wave energy comprising a receiving device having right and left lobe characteristics providing two different signals having varying time retardation between themselves depending upon the orientation of said receiving device, a lag line connected across said receiving device for combining a phase shifted portion of each signal with an unshifted portion of the other signal, whereby a difference in phase is converted to a difference in intensity, means for converting the signals so changed into characteristic signals having different frequencies corresponding to the original signals, and indicating means operatively connected thereto for producing indication of the directive sense of said signals.

LAURENCE BATCHELDER.

REFERENCES CITED

The following references are of record in the file of this patent:

UNITED STATES PATENTS

| Number | Name | Date |
|---|---|---|
| 1,492,589 | Walker | May 6, 1924 |
| 1,562,950 | Fessenden | Nov. 24, 1925 |
| 1,788,522 | Horton | Jan. 13, 1931 |
| 1,864,638 | Chilowsky | June 28, 1932 |
| 1,904,534 | Rice | Apr. 18, 1933 |
| 1,983,254 | Turner | Dec. 4, 1934 |
| 2,018,463 | Muchow | Oct. 22, 1935 |
| 2,063,534 | Wallace | Dec. 8, 1936 |
| 2,166,991 | Guanella | July 25, 1939 |
| 2,176,469 | Moueix | Oct. 17, 1939 |
| 2,225,046 | Hunter | Dec. 17, 1940 |
| 2,251,708 | Hefele | Aug. 5, 1941 |

FOREIGN PATENTS

| Number | Country | Date |
|---|---|---|
| 199,434 | Great Britain | June 13, 1923 |
| 323,182 | Great Britain | Dec. 20, 1929 |

Certificate of Correction

Patent No. 2,467,368. April 19, 1949.

LAURENCE BATCHELDER

It is hereby certified that errors appear in the printed specification of the above numbered patent requiring correction as follows:

Column 9, line 72, and column 10, line 12, claims 17 and 18 respectively, strike out "each of";

and that the said Letters Patent should be read with these corrections therein that the same may conform to the record of the case in the Patent Office.

Signed and sealed this 20th day of September, A. D. 1949.

[SEAL]

JOE E. DANIELS,
*Assistant Commissioner of Patents.*